United States Patent
Baita et al.

(10) Patent No.: US 8,735,514 B2
(45) Date of Patent: May 27, 2014

(54) METHOD FOR FEEDING AN ANTISTATIC COMPOUND TO A POLYMERIZATION REACTOR

(75) Inventors: Pietro Baita, Santa Maria Maddalena (IT); Paolo Ferrari, Ferrara (IT); Ines Mingozzi, Ferrara (IT); Lorella Pedriali, Ferrara (IT); Maria Di Diego, Bologna (IT); Roberta Pica, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/825,946

(22) PCT Filed: Sep. 29, 2011

(86) PCT No.: PCT/EP2011/066679
§ 371 (c)(1),
(2), (4) Date: Mar. 25, 2013

(87) PCT Pub. No.: WO2012/041810
PCT Pub. Date: Apr. 5, 2012

(65) Prior Publication Data
US 2013/0197169 A1    Aug. 1, 2013

Related U.S. Application Data

(60) Provisional application No. 61/404,706, filed on Oct. 7, 2010.

(30) Foreign Application Priority Data

Sep. 28, 2010   (EP) ..................... 10181136

(51) Int. Cl.
C08F 2/44   (2006.01)
C08F 2/00   (2006.01)
C08F 4/16   (2006.01)
C08F 10/00  (2006.01)

(52) U.S. Cl.
USPC ............. 526/74; 526/208; 526/210; 526/211; 526/220; 526/919; 502/167; 502/172

(58) Field of Classification Search
USPC ............. 526/74, 88, 919, 208, 210, 211, 220; 502/167, 172
See application file for complete search history.

(56) References Cited

U.S. PATENT DOCUMENTS 5,034,481 A * 7/1991 Funk et al. ............... 526/74
6,245,868 B1  6/2001 Agapiou et al.
(Continued)

FOREIGN PATENT DOCUMENTS

EP    2192133    6/2010
WO   WO2008022900  2/2008

OTHER PUBLICATIONS

Shell Odina Oils Product Data Sheet, 155-156, Issued Oct. 2002.*
(Continued)

Primary Examiner — Fred M Teskin

(57) ABSTRACT

A method for feeding an antistatic compound to a polymerization reactor, the method comprising the steps of: a) dispersing, under mixing conditions, a catalyst powder and an antistatic compound in a liquid medium, so as to form a suspension of the catalyst powder and of the antistatic compound in the liquid medium; b) transferring the obtained suspension to a polymerization reactor.

12 Claims, 1 Drawing Sheet

(56) References Cited

U.S. PATENT DOCUMENTS

2001/0012496 A1 8/2001 Agapiou et al.
2001/0020072 A1 9/2001 Agapiou et al.
2011/0282013 A1 11/2011 Baita et al.

OTHER PUBLICATIONS

PCT International Search Report & Written Opinion mailed Jan. 17, 2012, for PCT/EP2011/066679.

* cited by examiner

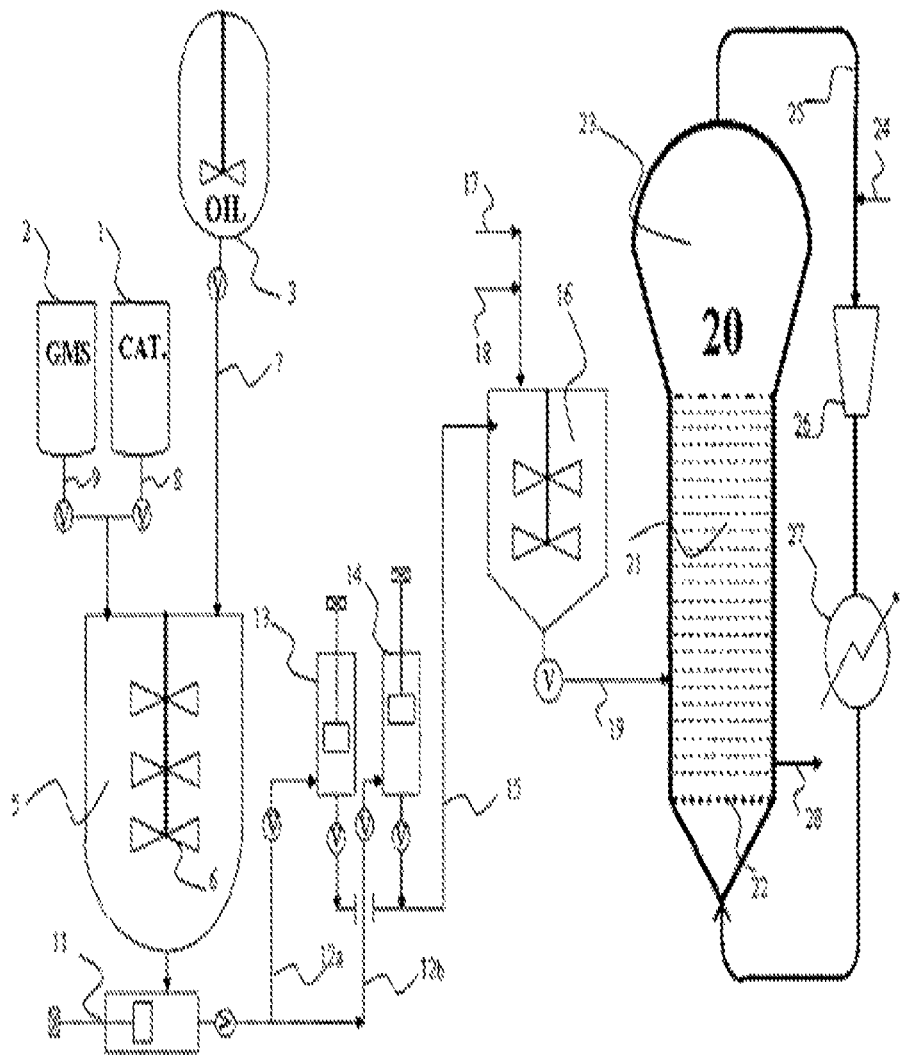

METHOD FOR FEEDING AN ANTISTATIC COMPOUND TO A POLYMERIZATION REACTOR

CROSS REFERENCE TO RELATED APPLICATIONS

This application is the U.S. National Phase of PCT International Application PCT/EP2011/066679, filed Sep. 26, 2011, claiming priority of European Patent Application No. 10181136.2, filed Sep. 28, 2010 and the benefit under 35 U.S.C. 119(e) of U.S. Provisional Application No. 61/403,706, filed Oct. 7, 2010, the contents of which are incorporated herein by reference in their entirety.

BACKGROUND OF THE INVENTION

1. Field of the Invention

The present invention relates to a method for feeding an antistatic compound to a polymerization reactor. The invention also relates to a process for the polymerization of olefins carried out in the presence of an antistatic compound fed to the polymerization reactor with the method of the invention.

2. Description of the Related Art

In polymerization processes carried out in continuous, particularly in gas-phase processes for olefin polymerization, there is the need to face up to the formation of polymer agglomerates in the polymerization reactor. The polymer agglomerates involves many negative effects: for example, they can disrupt the discharge of polymer from the reactor by plugging the polymer discharge valves. Furthermore, the agglomerates may also partially cover the fluidization grid of the reactor with a loss in the fluidization efficiency.

It has been found that the presence of fine polymer particles in the polymerization medium favors the formation of polymer agglomerates: these fines may be present as a result of introducing fine catalyst particles or breakage of catalyst and polymer particles within the polymerization medium. The fines are believed to deposit onto and electrostatically adhere to the inner walls of the polymerization reactor and the equipment for recycling the gaseous stream such as, for example, the heat exchanger. If the fines remain active, then the particles will grow in size resulting in the formation of agglomerates, also caused by the partial melting of the polymer itself. These agglomerates when formed within the polymerization reactor tend to be in the form of sheets. Agglomerates can also partially plug the heat exchanger designed to remove the heat of polymerization reaction.

Several solutions have been proposed to resolve the problem of formation of agglomerates during a gas-phase polymerization process. These solutions include the deactivation of the fine polymer particles, the control of the catalyst activity and, above all, the reduction of the electrostatic charge by introducing antistatic agents inside the reactor.

EP 359444 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,803,251 describes a process for reducing the polymer sheeting utilizing a group of chemical additives, which generate both positive and negative charges in the reactor, and which are fed to the reactor in an amount of from about 0.1 to about 25 ppm based on the monomer feed, preferably ethylene, in order to prevent the formation of undesired positive or negative charges.

EP 560035 discloses a polymerization process in which an anti-fouling compound is used to eliminate or reduce the build-up of polymer particles on the walls of a gas-phase polymerization reactor. This anti-fouling compound is preferably selected from alkydiethanolamines, which may be fed at any stage of the gas-phase polymerization process in an amount greater than 100 ppm by weight with respect to the produced (co)polymer. Said anti-fouling compound is capable to selectively inhibit the polymerization on polymer particles smaller than 850 µm, the latter being responsible for fouling problems and polymer sheeting.

It can be pointed out that, when polymerizing olefins by means of a fluidized bed reactor, the prior art literature mainly teaches to introduce antistatic or antifouling compounds directly inside the fluidized polymer bed. As an alternative, these additives are taught to be fed in correspondence of the gas recycle line of the polymerization reactor. Some chemical compounds having antistatic and/or antifouling properties are in a solid form at room temperature: examples of them are hydroxyesters, such as glyceryl monostearate (GMS) and glyceryl monopalmitate. Of course, the high temperatures existing inside a gas-phase polymerization reactor guarantee a quick melting of such solid additives, once they are introduced into the reactor. However, technical problems arise for feeding said solid additives to the reactor, because they cannot flow through the feed lines, as in case of liquid antistatic compounds. It is therefore necessary to arrange a heater device on each feed line, so as to melt the additive and to ensure its flowability through the feed lines. Generally, more lines for feeding an antistatic are present in a gas-phase polymerization plant, so that, notwithstanding the total amount of additive to be fed is low, the arrangement of more heaters on each feed line (jacketed pipes) increases the complexity of the polymerization plant and the energy consumption.

For the above reasons, it would be largely desirable to find an alternative method for introducing antistatic and/or antifouling compounds into a polymerization reactor.

BRIEF SUMMARY OF THE INVENTION

The Applicant has now surprisingly found an innovative method for feeding antistatic components to a polymerization reactor, the method comprising the preparation of a catalyst suspension incorporating said antistatic components and the successive transfer of the catalyst suspension to the polymerization reactor.

BRIEF DESCRIPTION OF THE DRAWINGS

The drawing shows an embodiment to carry out the invention in which a Ziegler-Natta catalyst powder and microbeads of glycerol monostearate (GMS90) as an antistatic are used to prepare the catalyst suspension.

DETAILED DESCRIPTION OF THE INVENTION

It is therefore a first object of the present invention a method for feeding an antistatic compound to a polymerization reactor, the method comprising the steps of:
a) dispersing, under mixing conditions, a catalyst powder and an antistatic compound in a liquid medium, so as to form a suspension of the catalyst powder and of the antistatic compound in the liquid medium;
b) transferring the obtained suspension to a polymerization reactor.

The method according to the present invention reveals particularly advantageous, since it allows to prepare a catalyst suspension preserving the catalyst morphology throughout the line connecting the catalyst storage vessel to the polymerization reactor. Moreover, the method achieves also the introduction into a polymerization reactor of antistatic and/or anti-fouling additives together with the catalyst suspension, thus reducing the risk to have fouling problems inside the polymerization reactor.

The terms "anti-fouling agent" or "antistatic agent", as used in the present description, include:
- antistatic substances capable of neutralizing the electrostatic charges of the polymer particles;
- cocatalyst deactivators that partially deactivate the aluminium alkyl co-catalyst, provided that they do not substantially inhibit the overall polymerization activity.

Consequently, an "anti-fouling agent" or "antistatic agent" according to the invention is any substance that is capable to prevent, eliminate or substantially reduce the formation of build-up of polymer on any equipment of the polymerization plant, including sheeting of reactor walls and deposit of polymer agglomerates onto the gas recycle line.

The "liquid medium" used to form the suspension of present invention is necessarily an inert compound towards the catalyst system, that is to say it cannot react with the catalyst components, such as the solid component, the donor compounds and the catalyst activators.

The "liquid medium" used in present invention may be selected from liquid hydrocarbons having a number of carbon atoms from 3 to 12. Alternatively, the liquid medium may be selected from mineral oils and synthetic oils.

Mineral oils are a mixture of hydrocarbons having a molecular weight distribution comprised between 100 and 1000, with an average molecular weight Mw ranging from 200 to 500. They are liquid compounds at room temperature, immiscible with water and have a relatively low vapor pressure. Preferred mineral oils are paraffinic white oils and, among these, vaseline oils. Moreover, being the catalyst extremely sensitive to oxygen and moisture, the liquid medium used to prepare the catalyst suspension has to be previously degassed, by means of storage under an inert atmosphere and drying with a nitrogen flow: this pretreatment removes traces of humidity and oxygen.

The liquid medium is generally the first component which is loaded in the dispersion tank used to prepare the catalyst suspension of the invention. The catalyst powder should preferably be added slowly to the dispersion tank containing the liquid medium, in order to favors an optimal dispersion of the catalyst powder in the mass of liquid medium, avoiding the formation of agglomerates of catalyst inside the liquid medium.

The catalyst powder has to be previously stored inside a drum under an inert atmosphere. Preferred catalyst components used to form the catalyst suspension of the invention are Ziegler-Natta catalyst components comprising a magnesium halide, a titanium compound having at least a Ti-halogen bond, and optionally electron donor compounds.

The antistatic compound used in the present invention may be incorporated in the catalyst suspension in a liquid form, or alternatively, in solid form. The physical state of the antistatic incorporated in the catalyst suspension depends on melting point of the antistatic and on the selected temperature when forming the catalyst suspension. In any case, the operative conditions have to ensure a homogeneous dispersion of the antistatic agent in the liquid medium.

According to a first embodiment of the invention, the antistatic compound is incorporated in the catalyst suspension as a liquid component. In this case the dispersion tank is first loaded with the mass of liquid medium and successively the liquid antistatic is added to the dispersion tank under stirring conditions. These two liquid components are mixed each other for a time generally comprised between 10 and 60 minutes, preferably between 20 and 45 minutes. The stirring conditions favor an intimate mixing of the antistatic with the liquid medium, thus leading to the formation of a liquid mixture containing the liquid medium and the antistatic compound. Successively, the catalyst powder is loaded into the dispersion tank and the catalyst is dispersed in the liquid medium/antistatic mixture by keeping the tank under mixing conditions for a time comprised between 30 and 150 minutes, preferably between 45 and 120 minutes.

According to a second embodiment of the invention, the antistatic compound is incorporated in the catalyst suspension as a solid component, for instance in form of powder or microbeads. This embodiment may be applied to those antistatic agents, which are in solid state at room temperature. In this case, the catalyst suspension of present invention may be prepared following two different alternative procedures, denominated "low temperature procedure" and "high temperature procedure".

According to the "low temperature procedure", both the catalyst and the antistatic are dispersed as solid components in the liquid medium and the liquid medium is fed to the dispersion tank at a temperature ranging from 5 C.° to 40° C., preferably from 10 to 30° C. The dispersion tank is equipped with a stirring device, which may be, for instance, an anchor stirrer or a ribbon stirrer. Successively, the catalyst and the antistatic powder are loaded to the dispersion tank containing the liquid medium, while maintaining the dispersion tank under stirring conditions. The feed sequence of catalyst powder and antistatic to the dispersion tank may be in any whatever order, but preferably these solid components are loaded simultaneously from a storage drum containing these components in a premixed form. After their introduction in the tank containing the liquid medium, the suspension is kept under mixing conditions for a time comprised between 30 and 150 minutes, preferably between 45 and 120 minutes, in order to assure a complete wetting and dispersion of catalyst and antistatic powder in the liquid medium.

According to the "high temperature procedure", the liquid medium is fed at a temperature ranging from 40 C.° to 90° C., preferably from 60 to 80° C., to a dispersion tank equipped with a stirring device. Successively, the catalyst powder is loaded into the dispersion tank, while maintaining the temperature in the same range of high temperature (40-90° C.). The mixture of liquid medium and catalyst powder is hence maintained under stirring conditions for a time comprised between 30 and 150 minutes, preferably between 45 and 120 minutes, in order to assure a complete dispersion of the catalyst in the liquid medium.

Successively, the obtained suspension of catalyst is cooled at a temperature ranging from 5 to 40° C., preferably from 20 to 35° C., and only at this stage the catalyst suspension is added with powder or microbeads of the antistatic compound, while maintaining the suspension under stirring conditions. After the feed of the antistatic, the suspension is then maintained under mixing conditions for a time comprised between 10 and 120 minutes, preferably between 30 and 90 minutes, to assure a complete dispersion of the antistatic agent in the liquid medium.

During the preparation of the catalyst suspension the mixing conditions are suitably selected with a stirring intensity such to avoid the settling of catalyst and antistatic powder on the bottom of the dispersion tank. On the other hand, the tip speed of the stirring device cannot exceed an upper limit, which could otherwise cause the breakage of the catalyst powder when striking against the stirring device. As a consequence, the mixing conditions during the preparation of the catalyst suspension are adjusted by keeping the tip speed of the stirring device of the dispersion tank at values comprised between 0.2 and 0.8 m/s, preferably between 0.4 and 0.6 m/s.

The amount of catalyst powder fed to step a) of the invention is such to form a catalyst suspension in the liquid medium with a concentration from 30 g/l to 400 g/l, preferably from 50 g/l to 250 g/l (grams of catalyst for liter of liquid medium).

The amount of antistatic compound fed to step a) of the invention is such that the weight ratio between the antistatic and the catalyst is generally comprised in a range from 0.01 to 5.0, preferably from 0.10 to 3.0.

Suitable anti-fouling agents may be selected from the following classes:
(1) hydroxyesters with at least two free hydroxyl groups, such as glycerol monostearate (GMS90) and glycerol mono palmitate;
(2) alcohols containing up to 7 carbon atoms;
(3) ketones containing up to 7 carbon atoms;
(4) polyepoxidate oils, such as epoxidized soybean oil (for example EDENOL D81) and epoxidized linseed oil (for example EDENOL D316);
(5) polyglycerol esters, such as diglycerol monooleate (for example GRINSTED PGE 080/D);
(6) alkyldiethanolammines of formula R—$N(CH_2CH_2OH)_2$ wherein R is an alkyl radical comprised between 10 and 20 carbon atoms;
(7) amides of formula R—CONR'R", wherein R, R', and R" may be the same or different, and are a saturated or unsaturated hydrocarbon radical having 1 to 20 carbon atoms.

The preferred class of antistatic agents used in the process of the invention is represented by the hydroxyesters of class (1). The most preferred is glycerol monostearate (GMS90), which is added to the dispersion tank of step a) in form of powder or micro-beads: preferred morphologies are micro-beads.

Among the compounds of class (6) the preferred antistatic is a commercial product sold under the trademark ATMER163® (synthetic mixture of alkyldiethanolammines of formula R—$N(CH_2CH_2OH)_2$, where R is an alkyl radical $C_{13}$-$C_{15}$). Also natural-based alkyldiethanolammines may be mentioned, for instance ARMOSTAT 410LM.

The method according to the present invention presents the following technical advantages. The adopted operative conditions are such to assure a complete wetting of the catalyst particles, including the particle pores, by the liquid medium, so that the interposition of a layer of liquid medium hinders an accidental direct friction between the catalyst particles. This contributes to preserve the morphologic properties of the catalytic particles along the line feeding the catalyst suspension to a polymerization reactor, avoiding an undesired formation of low size particles of polymer (fines) during the successive prepolymerization and polymerization steps. Moreover, differently from the catalytic suspensions known in the art, the catalyst suspension of present invention contains incorporated at least one antistatic agent, which is freely released in the polymerization medium in form of a finely divided liquid, once the catalyst suspension enters the polymerization reactor. This gives the additional advantage of reducing the electrostatic charges in the polymerization medium, and minimizing the fouling problems inside the polymerization reactor.

It is therefore a second object of the invention a catalyst suspension comprising a catalyst powder and at least one antistatic compound dispersed in a liquid medium, said catalyst suspension being characterized in that the catalyst concentration in said liquid medium ranges from 30 g/l to 400 g/l, preferably from 50 g/l to 250 g/l and the weight ratio between said antistatic and said catalyst is generally comprised in a range from 0.01 to 5.0, preferably from 0.10 to 3.0.

The "liquid medium" used to prepare the above catalyst suspension may be selected from liquid hydrocarbons having a number of carbon atoms from 3 to 12. Alternatively, the liquid medium may be selected from mineral oils and synthetic oils. Mineral oils are a mixture of hydrocarbons having a molecular weight distribution comprised between 100 and 1000, with an average molecular weight Mw ranging from 200 to 500 (measured at 150° C. and a flow rate of 1.0 mL/min by gel permeation chromatography).

Preferred mineral oils are paraffinic white oils and, among these, vaseline oils. White oils are colorless, odorless, tasteless mixtures of saturated paraffinic and naphthenic hydrocarbons. These nearly chemically inert oils are virtually free of nitrogen, sulfur, oxygen and aromatic hydrocarbons. Suitable white oils are OB22 AT, Winog 70, Duo Prime 500, Fina Vestan A 360B and Shell Ondina 64.

Synthetic oils are selected from silicon oils and chemical compounds synthesized using chemically modified petroleum components, rather than whole crude oil. Synthetic oils can be obtained, for instance, by the oligomerization of decene, fractionating the product to an average of 30 carbon atoms and successive hydrogenation.

It has been further observed that a low viscosity of the oil contributes to maintain unchanged the particle size distribution of the catalytic particles during the preparation of the catalyst suspension of the invention. As a consequence, it is preferable to select paraffinic white oil with a low dynamic viscosity. Generally, suitable paraffin white oils used in the present invention have a dynamic viscosity at 20° C. comprised between 10 and 250 centiPoise, preferably between 20 and 200 centiPoise.

Preferred catalyst components used to form the catalyst suspension of the invention are Ziegler-Natta catalyst components comprising a magnesium halide, a titanium compound having at least a Ti-halogen bond, and optionally electron donor compounds. The magnesium halide is preferably $MgCl_2$ in active form which is widely known from the patent literature as a support for Ziegler-Natta catalysts. The preferred titanium compounds are $TiCl_4$ and $TiCl_3$; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

Other solid catalyst components which may be used are catalysts based on a chromium oxide supported on a refractory oxide, such as silica, and activated by a heat treatment. These catalysts consist of chromium (VI) trioxide, chemically fixed on silica gel. These catalysts are produced under oxidizing conditions by heating the silica gels that have been doped with chromium(III) salts (precursor or precatalyst). During this heat treatment, the chromium(III) oxidizes to chromium(VI), the chromium(VI) is fixed and the silica gel hydroxyl group is eliminated as water.

Other useful solid catalyst components are single-site catalysts supported on a carrier, preferably metallocene catalysts comprising:
(1) at least a transition metal compound containing at least one π bond;
(2) at least a cocatalyst selected from an alumoxane or a compound able to form an alkylmetallocene cation.

Other advantages and features of the present invention are illustrated in the following detailed description with reference to the attached drawing, which shows a process embodiment which is representative and not limitative of the scope of the invention.

The drawing shows an embodiment to carry out the invention in which a Ziegler-Natta catalyst powder and microbeads of glycerol monostearate (GMS90) as an antistatic are used to prepare the catalyst suspension. The drawing also shows devices and lines suitable to convey the catalyst suspension from the preparation tank up to the polymerization reactor, including the steps of catalyst activation and the olefin polymerization in a fluidized bed reactor.

A Ziegler-Natta catalytic component is stored in form of a dry powder inside the drum 1, while microbeads of glycerol monostearate are stored in drum 2. The vessel 3 contains the liquid medium, for instance a paraffin white oil, necessary to form the catalyst suspension of the invention. A dispersion tank 5 endowed with a stirring device 6 is used to prepare the catalyst suspension. The dispersion tank 5 is first filled with the oil coming from the vessel 3 via line 7.

The catalyst powder is discharged from storage drum 1 via line 8, while the microbeads of GMS90 are discharged from drum 2 via line 9. Both these components are loaded into dispersion tank 5 filled with oil and their load may be performed simultaneously.

When the feeding of the catalyst powder and the antistatic agent in dispersion tank 5 is completed, the mixture is maintained under stirring for the above indicated suitable time in order to assure a complete dispersion of the catalyst and GMS90 in the oily mass.

As shown in the drawing, the catalyst suspension is withdrawn from dispersion tank 5 avoiding the use of a discharge valve, e.g. a ball valve, but using a device capable of withdrawing the dispersion of catalyst without rough movements. A dosing syringe 11 is used for softly withdrawing the catalyst suspension from the dispersion tank 5 and softly pushing it into line 12a and 12b. Moreover, a couple of two dosing syringes 13 and 14 is exploited for ensuring a continuous and delicate metering of catalyst suspension to the successive step of catalyst activation. While the syringe 13 is filled with catalyst suspension coming from line 12a, the second syringe 14 pushes and transfers the catalyst suspension to line 15. Likewise, when the syringe 14 is filled with catalyst suspension coming from line 12b, the first syringe 13 pushes and transfers the catalyst suspension to line 15 and consequently to a catalyst activation vessel 16.

An organo-aluminum compound as the catalyst activator is fed via line 17 to the activation vessel 16. Also a hydrocarbon solvent, such as propane, is conveniently fed via line 18 to the activation vessel 16, optionally together with an electron donor compound.

The activated catalyst system is hence discharged from the activation vessel 16 and fed via line 19 to a fluidized bed reactor 20. This gas-phase reactor is typically operated at a pressure comprised between 10 and 30 bar and at a temperature comprised between 50 and 110° C.

The fluidized bed reactor 20 comprises a fluidized bed 21 of polymer, a fluidization grid 22 and a velocity reduction zone 23. The velocity reduction zone 23 is generally of increased diameter compared to the diameter of the fluidized bed portion of the reactor. The polymer bed is kept in a fluidization state by an upwardly flow of gas fed through the fluidization grid 23 placed at the bottom portion of the reactor.

Schematically, fresh olefin monomers, for instance ethylene and 1-hexene, are fed to the fluidised bed reactor 20 via line 24, which is arranged on correspondence of the gas recycle line 25, through which the unreacted monomers and polymerization diluents are continuously recycled from the velocity reduction zone 23 up to the fluidization grid 22.

The gas recycle line 25 is equipped with a compressor 26 and a heat exchanger 27 placed downstream the compressor 26. The produced polyolefin is continuously discharged from the polymer bed via line 28 and is then transferred to the finishing section of the polymerization plant, or alternatively, it may be transferred to a second gas-phase reactor (not shown) when a multistage polymerization process is performed.

For the above explained reasons, the catalyst suspension comprising at least one antistatic compound, as here disclosed, is particularly suitable to be used in a gas-phase or a liquid phase reactor for polymerization of olefins. The use of this catalyst suspension ensures a controlled flow rate of catalyst powder introduced into the polymerization reactor, and simultaneously a continuous release in the polymerization medium of an antistatic compound able to neutralize the electrostatic charges.

It is therefore a third object of this patent Application the use of the above catalyst suspension comprising at least one antistatic compound in a process for the polymerization of olefins.

It is a further object of the invention a process for the polymerization of olefins comprising the step of polymerizing one or more α-olefins of formula $CH_2=CHR$, where R is hydrogen or a hydrocarbon radical having from 1 to 12 carbon atoms, in one or more polymerization reactors in the presence of an antistatic compound fed to the polymerization reactor by the above described method.

The catalyst suspension may be optionally subjected to prepolymerization in a loop reactor before the feeding to the polymerization reactor. The prepolymerization of the catalyst system is usually carried out at a low temperature in a range from 0° C. to 60° C.

The method of the invention is suitable to feed an antistatic compound to any polymerization plant comprising one or more liquid-phase and/or gas-phase polymerization reactors. The olefin polymerization step may be performed in liquid-phase reactors, such as loop reactors and continuously stirred tank reactors (CSTR).

The polymerization step may be also performed in one or more gas-phase polymerization reactors including fluidized bed reactors, stirred bed reactors and reactors having two interconnected polymerization zones, as described in EP-B-782587 and EP-B-1012195.

The invention claimed is:

1. A method for feeding an antistatic compound to a polymerization reactor, the method comprising the steps of:
   a) dispersing, under mixing conditions, a catalyst powder and an antistatic compound in a liquid medium, so as to form a suspension of the catalyst powder and of the antistatic compound in the liquid medium;
   b) transferring the obtained suspension to a polymerization reactor
   wherein the antistatic compound is incorporated in the catalyst suspension as a solid component.

2. The method of claim 1, wherein step a) comprises the sequence of:
   (i) feeding said liquid medium at a temperature ranging from 5° C. to 40° C. to a dispersion tank equipped with a stirring device;
   (ii) loading in whatever order said catalyst powder and said antistatic compound to said dispersion tank, while maintaining the dispersion tank under mixing conditions;
   (iii) subjecting the suspension to mixing conditions for a time between 30 and 150 minutes.

3. The method of claim 1, wherein step a) comprises the sequence of:
(i) feeding said liquid medium at a temperature ranging from 40° C. to 90° C. to a dispersion tank equipped with a stirring device;
(ii) loading the catalyst powder into said dispersion tank, while maintaining the temperature in a range from 40° C. to 90° C.,
(iii) mixing the suspension of catalyst in said liquid medium for a time between 30 and 150 minutes,
(iv) cooling the catalyst suspension at a temperature ranging from 5° C. to 40° C.,
(v) adding said antistatic compound in the form of powder or microbeads to the catalyst suspension, while maintaining the suspension under mixing conditions,
(vi) subjecting the suspension to mixing conditions for a time between 10 and 120 minutes.

4. The method of claim 1, wherein said liquid medium is a $C_3$-$C_{12}$ liquid hydrocarbon.

5. The method of claim 1, wherein said liquid medium is a paraffinic white oil with a dynamic viscosity at 20° C. between 10 and 250 centipoise.

6. The method of claim 1, wherein said antistatic compound is selected from the group consisting of:
(1) hydroxyesters with at least two free hydroxyl groups;
(2) alcohols containing up to 7 carbon atoms;
(3) ketones containing up to 7 carbon atoms;
(4) polyepoxidate soybean oils and epoxidized linseed oils;
(5) polyglycerol esters;
(6) alkyldiethanolammines of formula R—N(CH$_2$CH$_2$OH)$_2$ wherein R is an alkyl radical having from 10 to 20 carbon atoms; and
(7) amides of formula R—CONR'R", wherein R, R', and R" may be the same or different, and are a saturated or unsaturated hydrocarbon radical having 1 to 20 carbon atoms.

7. The method of claim 1, wherein said antistatic compound is glycerol monostearate.

8. A catalyst suspension comprising a catalyst powder and an antistatic compound dispersed in a liquid medium, wherein the catalyst concentration in the liquid medium ranges from 30 g/l to 400 g/l and the weight ratio between said antistatic compound and said catalyst powder is comprised in a range from 0.01 to 5.0 wherein said catalyst powder is a solid catalytic component comprising a magnesium halide, a titanium compound having at least a Ti-halogen bond, and optionally electron donor compounds.

9. The catalyst suspension according to claim 8, wherein said liquid medium is a $C_3$-$C_{12}$ liquid hydrocarbon.

10. The catalyst suspension according to claim 8, wherein said liquid medium is a paraffinic white oil with a dynamic viscosity between 10 and 250 centipoise measured at 20° C.

11. A process for the polymerization of olefins comprising the step of:
polymerizing one or more α-olefins of formula CH2=CHR,
wherein R is hydrogen or a hydrocarbon radical having from 1 to 12 carbon atoms, in one or more polymerization reactors in the presence of an antistatic compound
wherein the antistatic compound is fed to the one or more polymerization reactors by:
a) dispersing, under mixing conditions, a catalyst powder and an antistatic compound in a liquid medium, so as to form a suspension of the catalyst powder and of the antistatic compound in the liquid medium;
b) transferring the obtained suspension to a polymerization reactor
wherein the antistatic compound is incorporated in the catalyst suspension as a solid component.

12. The process according to claim 11, wherein the polymerization reactors are gas-phase reactors selected from fluidized bed reactors, stirred bed reactors and reactors having two interconnected polymerization zones.

* * * * *